Patented Aug. 31, 1948

2,448,270

UNITED STATES PATENT OFFICE 2,448,270

HEAT-TREATMENT OF PLURAL OXIDE GELS

Milton M. Marisic, Woodbury, N. J., assignor to Socony-Vacuum Oil Company, Incorporated, a corporation of New York No Drawing. Application April 6, 1944,
Serial No. 529,823

1 Claim. (Cl. 252—378)

This invention relates to a process for converting plural oxide gels having a major proportion of silica and a minor proportion of a heavy metal oxide to a different form by heat treating said gels at temperaures between about 1800° F. and the melting point thereof. By this process, it is possible to convert gels which have become useless for their original purpose into valuable products. For example, bead cracking catalyst prepared according to my prior application Serial No. 461,455, filed October 9, 1942, now U. S. Patent No. 2,384,946, issued September 18, 1945, may be rendered useful for other purposes when the cracking activity has fallen off to an uneconomical extent.

Catalysts comprising silica gel and minor proportions of oxides like $Al_2O_3$, $ZrO_2$, $ThO_2$, BeO, etc., have found extensive use in the petroleum industry as catalysts for hydrocarbon conversion reactions. During the normal operation of such hydrocarbon conversion processes, the catalysts are subjected to periodic regenerations in order to maintain the efficiency at as high a level as possible. These revivifications merely remove hydrocarbonaceous materials and do not activate the catalyst in any other way, nor do they overcome the normal aging of the catalyst. Aged catalysts are discarded when their activity has reached a point where further use is considered uneconomical. Such spent catalysts have had no value and no use for them has been developed up to the present time.

This invention is concerned with the utilization of spent hydrocarbon conversion catalysts and with their treatment to produce materials which are useful as inert catalyst supports, abrasives, filter aids, insulators, etc.

Bead catalysts prepared according to the process described in U. S. Patent No. 2,384,946, issued September 18, 1945, and utilized in the cracking of petroleum hydrocarbons age during normal use and undergo changes in physical structure as exemplified by the variations in physical properties noted in Table 1. Increasing age of the catalyst may be followed by noting the rise in apparent density and decrease in surface area. During aging the pore volume decreases to a minimum, then rises to a maximum and finally decreases to zero value.

Table 1

| Condition of Catalyst | Apparent Density | Surface Area Sq. Meters per gram | Pore Volume cc. per gram |
|---|---|---|---|
| Fresh Catalyst | 0.780 | 483 | 0.382 |
|  | 0.824 | 276 | 0.280 |
|  | 0.894 | 214 | 0.350 |
| Increasing Age | 1.07 | 100 | 0.181 |

The aged catalyst (88% $SiO_2$, 12% $Al_2O_3$) having an apparent density of 1.07 was considered spent. This bead catalyst was subjected to a temperature of 1800° F. for a period of about one hour. The beads at this point were still glassy in appearance, although some were starting to become opaque. The physical properties of these beads were measured and found to be: apparent density 1.29, surface area 2.5 square meters per gram, pore volume 0.003 cc. per gram and the true density 2.06. On continued heating at 1800° F. the beads turned completely opaque and then expanded in volume until they were approximately twice their original size and had an apparent density of 0.560. Further heating at 1800° F. resulted in the fracture of the beads with continued expansion. The expanded material attained a constant volume at an apparent density of 0.183. This material was an excellent catalyst diluent and support. On grinding the expanded material to a powder it was found to be an excellent filter aid, a good abrasive and by virtue of its low apparent density, a superior insulating material.

A spent bead cracking catalyst having an apparent density of 1.07 was heated at 1800° F. for a period of four hours. The heat-treated material which had an apparent density of 0.183 was soaked in a saturated solution of nickel nitrate overnight, dried and heated at 800° F. to decompose the nickel nitrate to nickel oxide. The nickel oxide impregnated catalyst was reduced with hydrogen at 1200° F. and tested in the conversion of methane and steam to hydrogen and oxides of carbon. Water vapor and methane in the volume ratio of 2:1 were preheated and passed over the catalyst at a space velocity of 310 at the temperatures noted in Table 2. Space velocity is defined as the volume of water vapor and methane at room temperature passed over unit volume of catalyst per hour. The reaction products were analyzed for carbon monoxide, carbon dioxide, hydrogen and unreacted methane. Data for the reaction of steam and methane at similar reaction conditions in the presence of conventional catalysts also are tabulated below.

Table 2

| Catalyst | Reaction Temperature, °F. | Reaction Products, Per cent | | | |
|---|---|---|---|---|---|
|  |  | $CH_4$ | CO | $CO_2$ | $H_2$ |
| Nickel on Expanded Silica Alumina Gel | 1,410 | 18.2 | 14.7 | 3.2 | 63.3 |
|  | 1,635 | 3.6 | 20.4 | 2.1 | 74 |
|  | 1,525 | 57 | 7.0 | 6.0 | 30 |
| Nickel Helices | 1,725 | 13.7 | 18.6 | 4.3 | 63.4 |
|  | 1,810 | 4.7 | 20.4 | 4.3 | 70.6 |
| Nickel Shot | 1,620 | 60.8 | 9.4 | 2.0 | 27.8 |
|  | 1,725 | 9.4 | 20.7 | 4.3 | 65.6 |

I claim:

The process which comprises heat treating a gel containing a major proportion of silica and a minor proportion of alumina at about 1800° F. for about four hours, whereby the gel is caused to pass through a stage of expansion and thereafter fracture and expand further, reaching a condition of constant volume.

MILTON M. MARISIC.

REFERENCES CITED

The following references are of record in the file of this patent:

UNITED STATES PATENTS

| Number | Name | Date |
| --- | --- | --- |
| 1,772,055 | Miller et al. | Aug. 5, 1930 |
| 1,927,102 | Sucetti et al. | Sept. 19, 1933 |
| 1,950,829 | Thomson | Mar. 13, 1934 |
| 2,021,956 | Gladney | Nov. 26, 1935 |
| 2,161,186 | Morgan et al. | June 6, 1939 |
| 2,198,990 | Cummins | Apr. 30, 1940 |
| 2,242,553 | Thomas et al. | May 20, 1941 |
| 2,388,060 | Hicks | Oct. 30, 1945 |

OTHER REFERENCES

Engineering and Mining Journal, Crouse, pages 923 and 924, Dec. 14, 1929.